Dec. 4, 1951 C. B. DALE 2,577,648
PHONOGRAPH RECORD CHANGER
Filed April 15, 1946 6 Sheets-Sheet 1
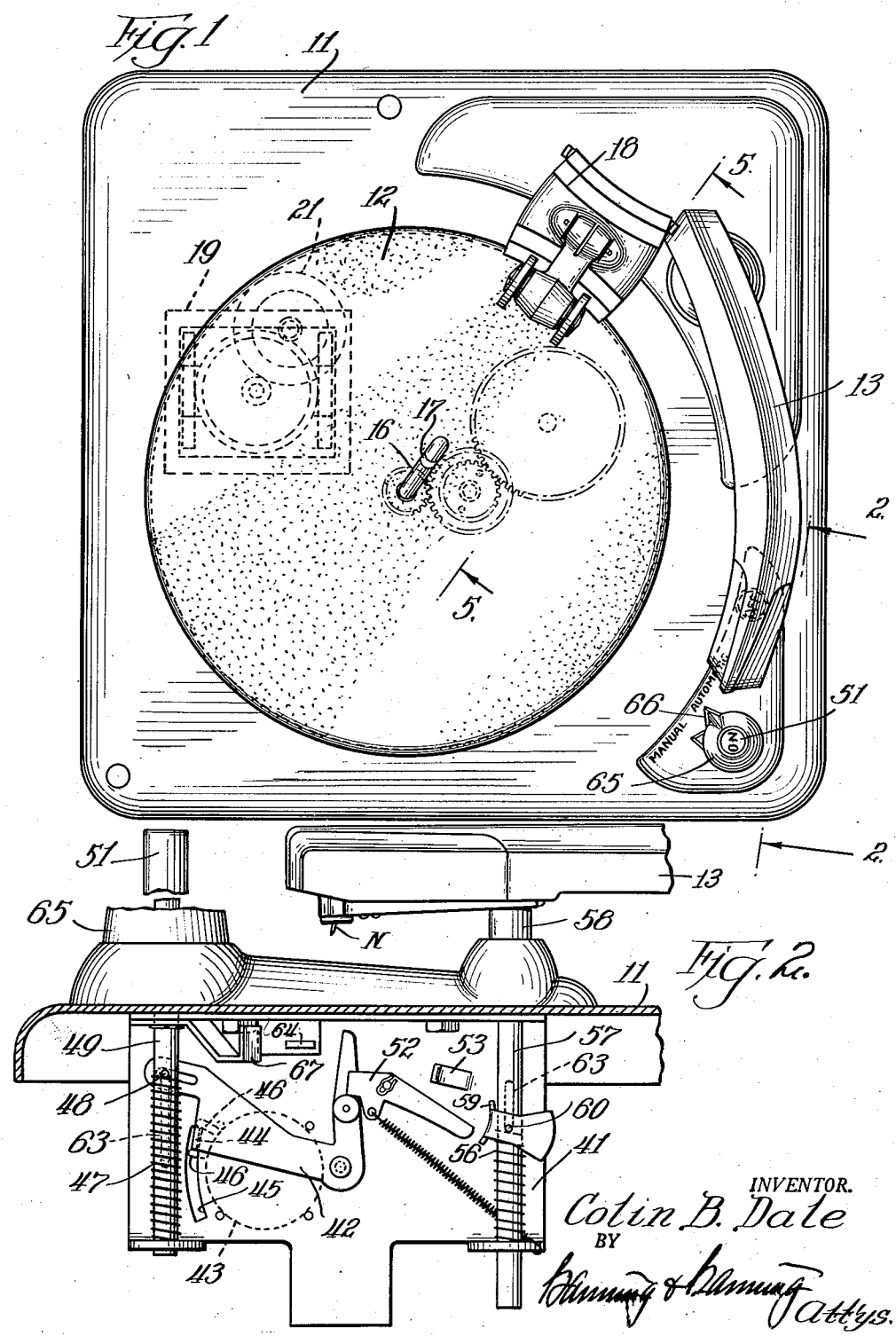
INVENTOR.
Colin B. Dale
BY
Hanning & Hanning
Attys.

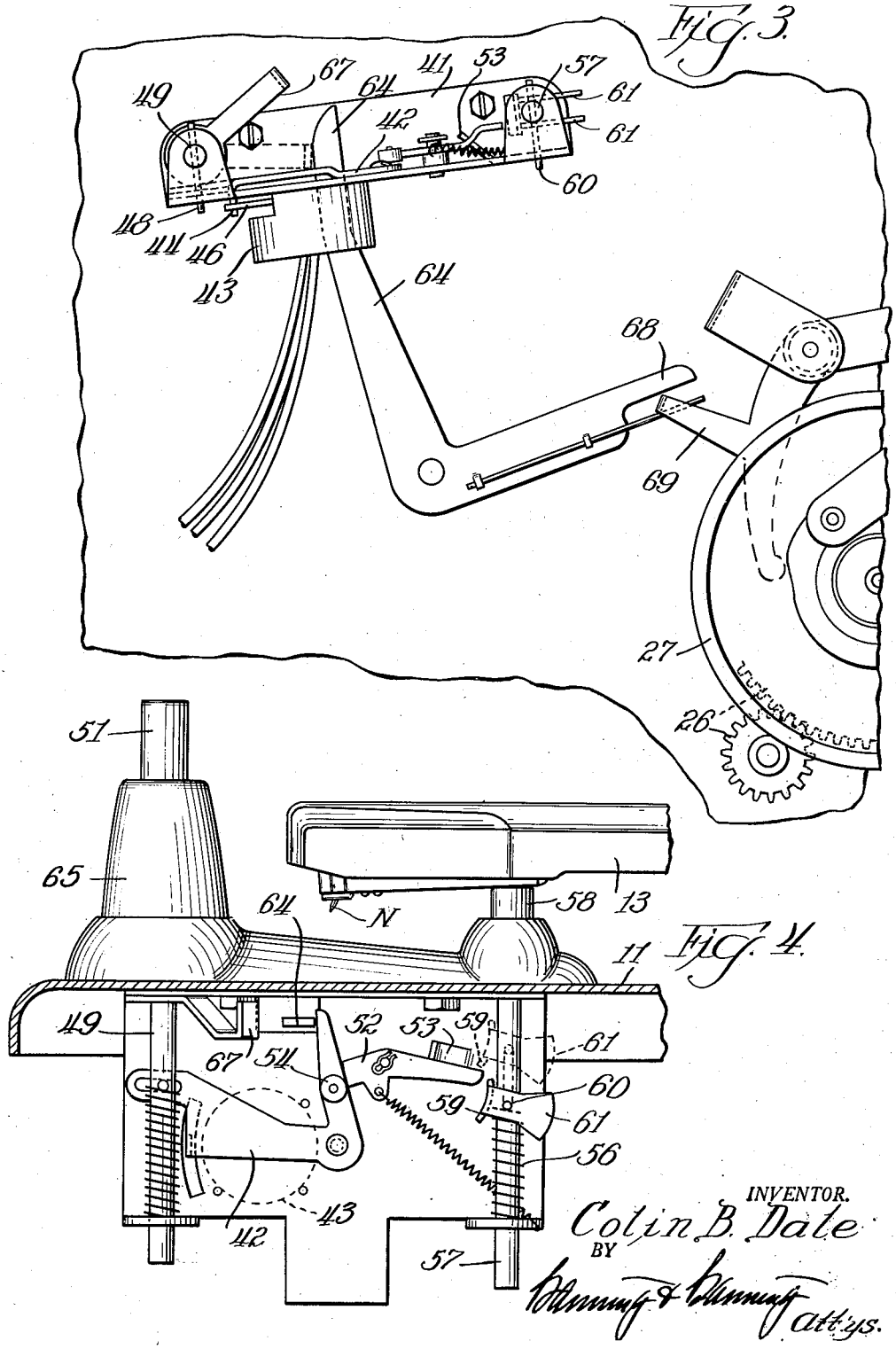

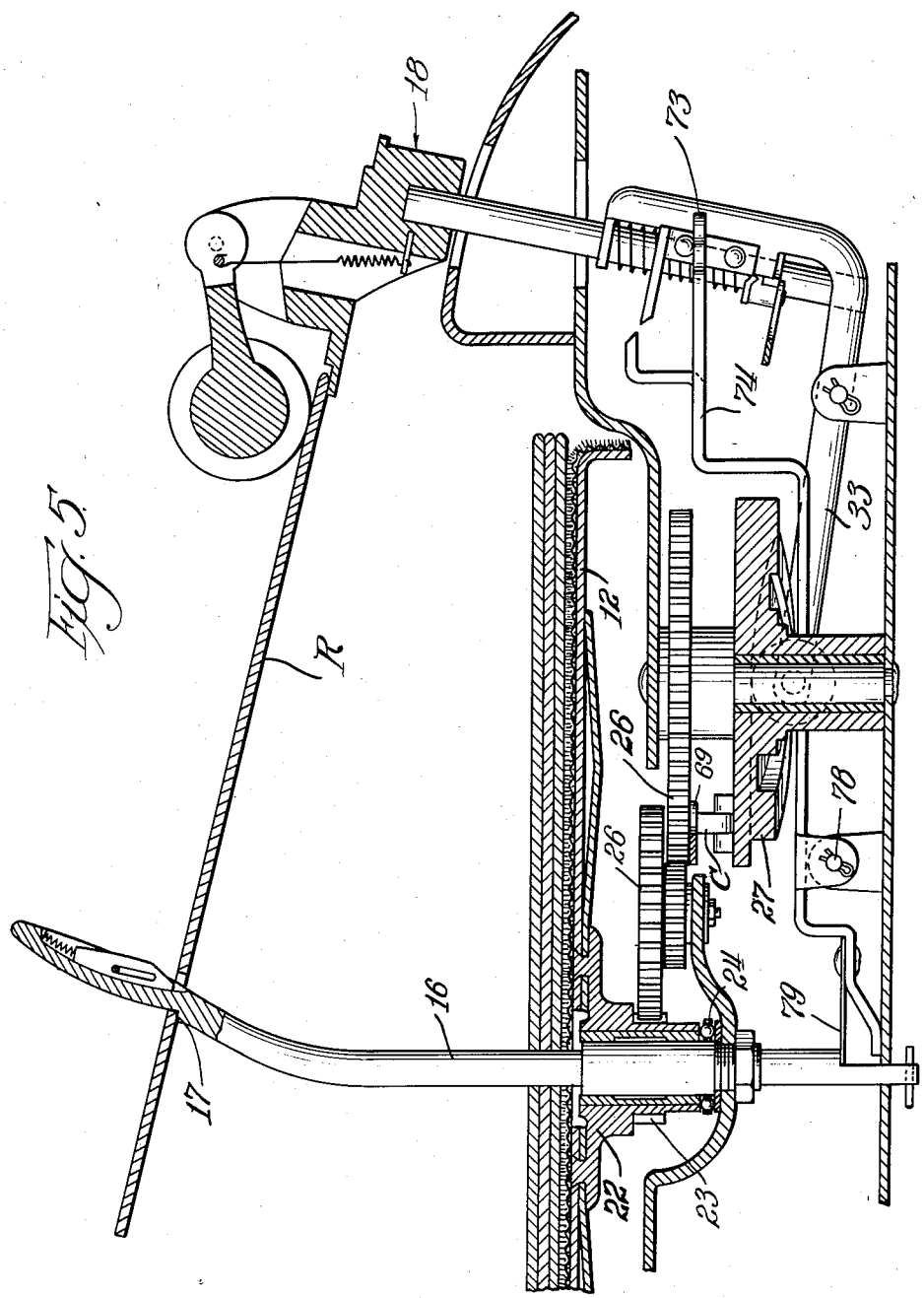

Dec. 4, 1951   C. B. DALE   2,577,648
PHONOGRAPH RECORD CHANGER
Filed April 15, 1946   6 Sheets-Sheet 4
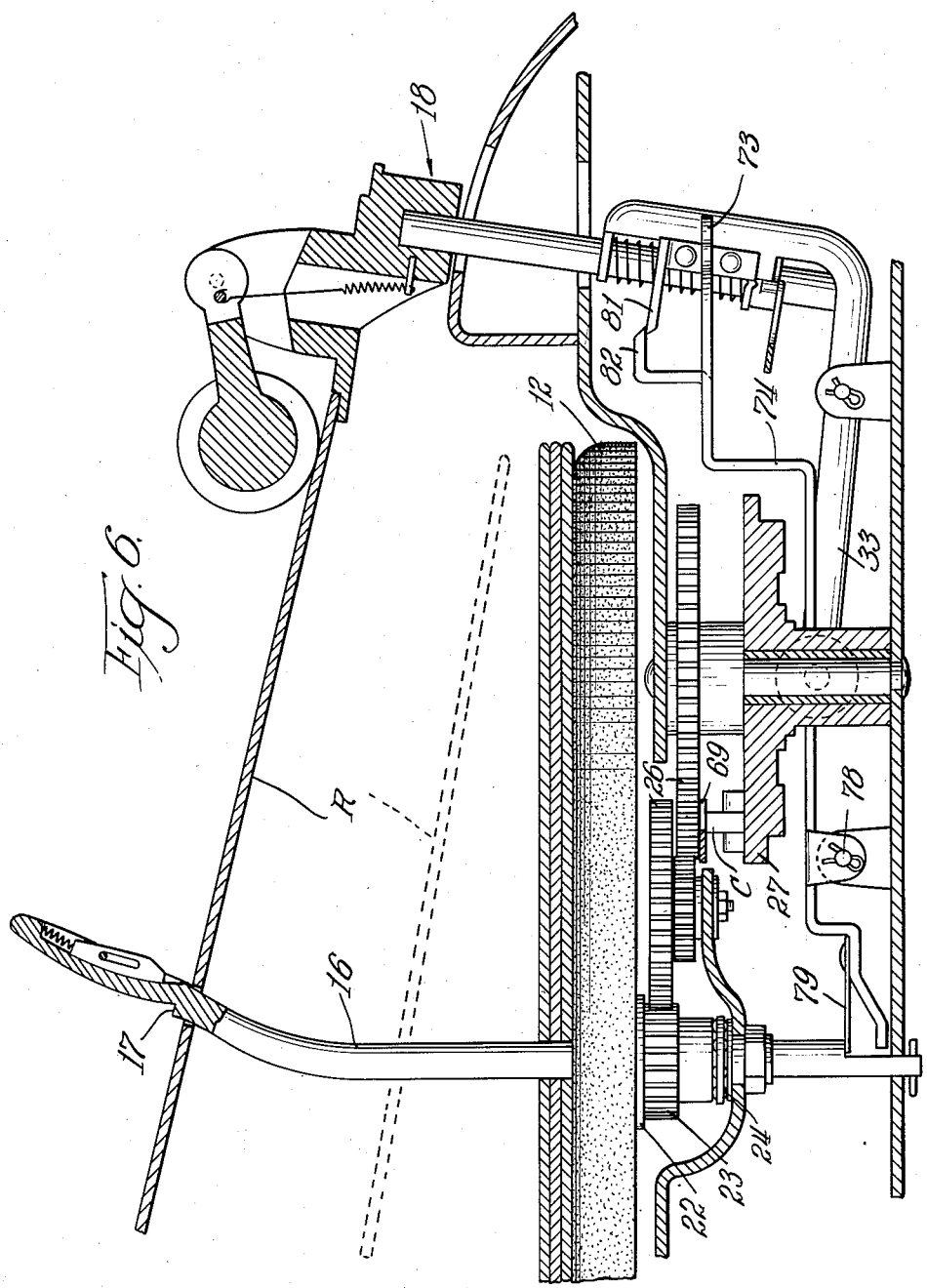
INVENTOR.
Colin B. Dale
BY
Blenning & Blenning
Att'ys Dec. 4, 1951 C. B. DALE 2,577,648
PHONOGRAPH RECORD CHANGER
Filed April 15, 1946 6 Sheets-Sheet 5
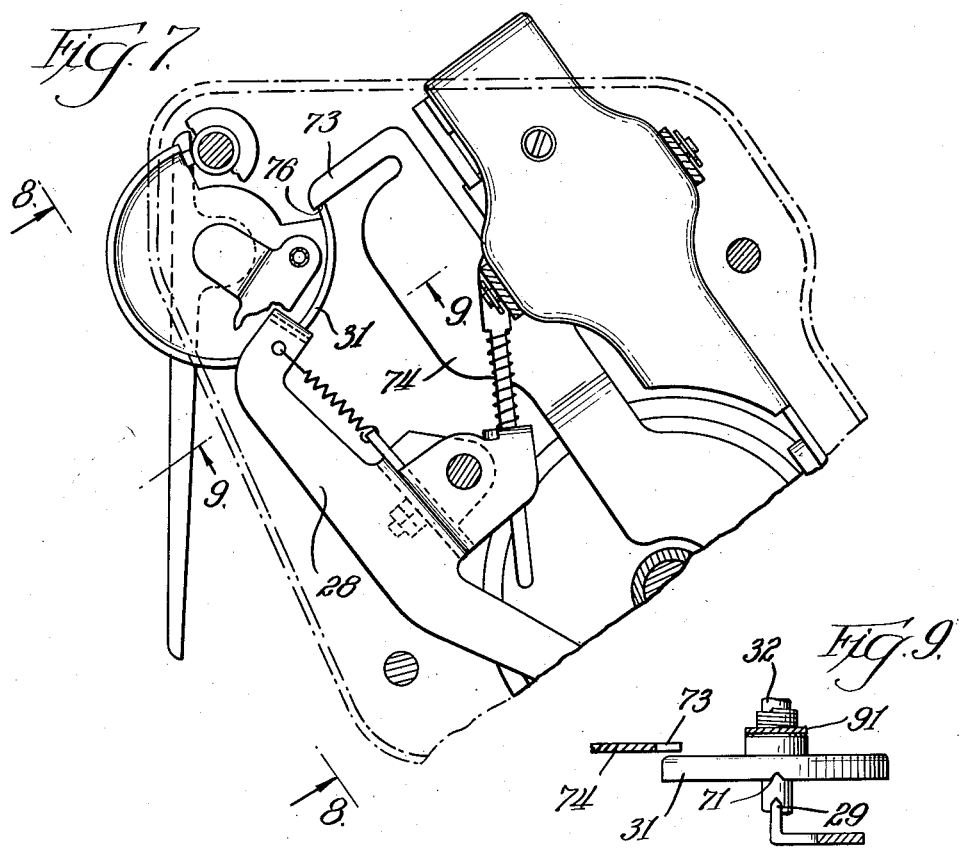
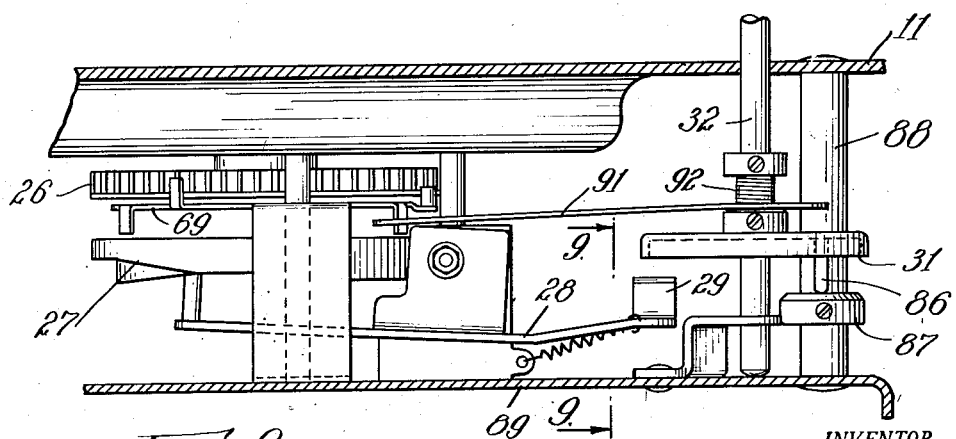
INVENTOR.
Colin B. Dale
BY
Henning & Henning Attys.

Dec. 4, 1951 C. B. DALE 2,577,648
PHONOGRAPH RECORD CHANGER
Filed April 15, 1946 6 Sheets-Sheet 6
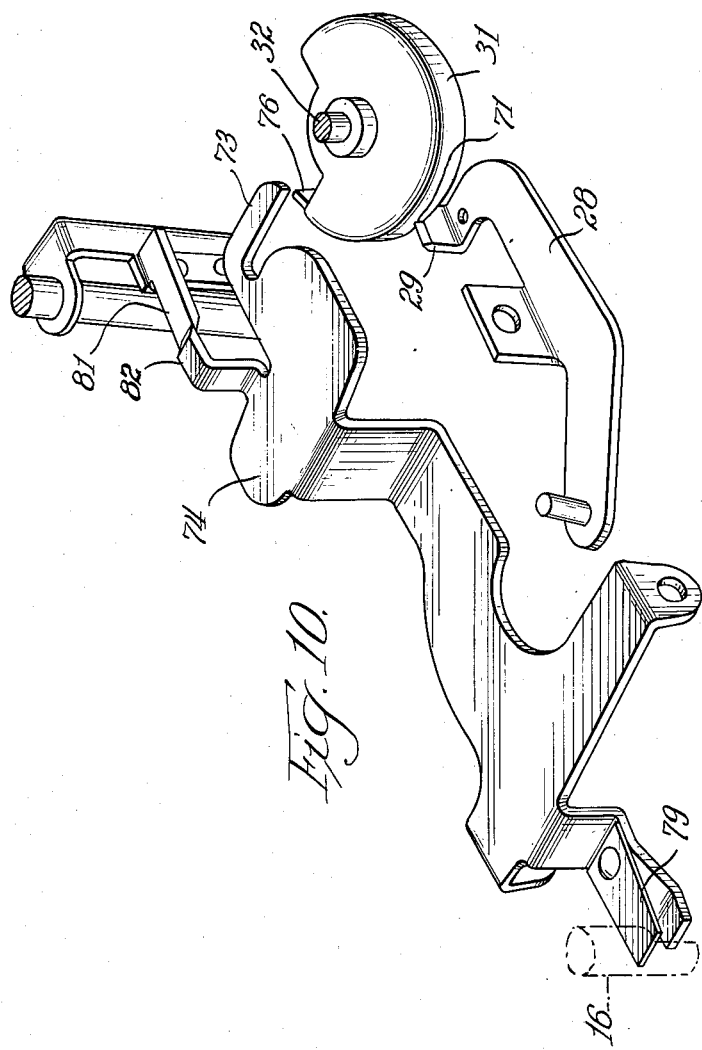
INVENTOR:
Colin B. Dale
BY
Blunning & Blunning Attys.

Patented Dec. 4, 1951

2,577,648

UNITED STATES PATENT OFFICE 2,577,648

PHONOGRAPH RECORD CHANGER

Colin B. Dale, Oak Park, Ill., assignor to Webster-Chicago Corporation, Chicago, Ill., a corporation of Illinois Application April 15, 1946, Serial No. 662,292

2 Claims. (Cl. 74—483)

In electrically operated automatic record-changing phonographs, it is desirable to provide an automatic shut-off for shutting off the main switch when all of the records have been played. This involves the problem of providing a detector to respond when the last record leaves the record holder and some delay device so that this detector will not be effective to shut off the machine until this last record has been played. Of course these ends can be accomplished by providing a stop mechanism which is manually set to the number of records to be played and some device for counting or detecting when this number has been played, but with the modern drop type of instrument this involves mechanical complications, and with any instrument it is not as fully automatic as is desirable.

Fully automatic shut-off devices have been provided heretofore but they have not been wholly suitable for all machines, and particularly not for the type of machine illustrated in the accompanying drawings and which is the subject matter of my copending application, Ser. No. 595,844, now Patent No. 2,509,811.

The present invention provides a very simple automatic delayed shut-off which is suitable for use with various types of record-changing phonographs such as that disclosed in said previous application. The present invention also preferably includes a resiliently-supported spindle, disclosed broadly in said previous application, the spindle being resiliently supported with respect to a pivoted lever which, independently of any resiliency, operates to weigh the spindle to detect the presence or absence of unplayed records thereon. This feature of resiliency protects the records as they are dropped onto a shoulder or shelf provided on the spindle for support of the records thereon.

Additional objects and advantages of the invention will be apparent from the following description and from the drawings, in which:

Fig. 1 is a top view of the record-changing apparatus chosen for illustration of the present invention;

Fig. 2 is a fragmentary sectional view taken approximately on the line 2—2 of Fig. 1, showing the side of the switch mechanism;

Fig. 3 is a fragmentary bottom view showing particularly the switch mechanism and the trip mechanism controlled by it;

Fig. 4 is a view similar to Fig. 2 but showing the switch mechanism when it has just been actuated to "on" position.

Figs. 5 and 6, which are fragmentary, vertical, sectional views taken approximately on the line 5—5 of Fig. 1, illustrate particularly the record push-off unit and its cooperation with the scale lever of this invention which weighs the spindle and, after delay by the push-off mechanism, causes the tone arm to be brought down on the stop button;

Fig. 7 is a fragmentary bottom plan view showing the cooperating portions of the scale lever, the push-off unit, and the tone arm control means;

Fig. 8 is a fragmentary, vertical, sectional view taken approximately on the line 8—8 of Fig. 7, showing particularly the tone arm control means;

Fig. 9 is a fragmentary detail view taken on the line 9—9 of Figs. 7 and 8, showing a fragment of the tone arm spindle unit and fragments of the control members therefor; and Fig. 10 is a fragmentary perspective view showing the scale lever being held by the push-off mechanism, but about to be dropped to a position in which it will block the return movement of the tone arm spindle so that the tone arm will be lowered on the stop button.

Many of the views are somewhat diagrammatical, particularly in that parts have been omitted for the sake of clarity, but in most material respects the drawings may be accepted as drawn substantially to scale.

The phonograph apparatus with which the present invention is illustrated is carried by a base 11 and includes a turntable 12 and a tone arm 13 supporting at its free end a needle N adapted to engage the record groove of a record on the turntable 12. A non-rotating spindle 16 which projects upwardly from the center of the turntable 12 is provided with a shelf 17 on which the unplayed records rest and from which they are pushed off one at a time by the push-off unit 18. The turntable is driven by a motor 19 which drives a friction drive wheel 21 engaging the inside of the downwardly turned rim of the turntable.

Record changing operation

As seen in Fig. 5, the turntable 12 is carried by a conically shaped hub 22 extended from a pinion 23 which rotates on the spindle 16 and preferably rests on a ball bearing unit 24. The pinion 23 drives gears 26 which rotate idly during the play of the record. At the end of a record, a clutch mechanism or dog C engages the cycling cam 27 to the gear 26 above it.

Referring to Fig. 8, it will be seen that the cycling cam controls a universally pivoted lever 28 to raise and swing a knife edge or detent 29 at its outer end to engage a skirt or cup 31 carried by a tone arm shaft 32, first raising the shaft and then swinging it to move the tone arm out away from the turntable. Cycling cam 27 is provided with both vertical and horizontal camming surfaces for operating lever 28 about its two axes.

Referring to Fig. 5, the cam 27 is adapted to rock a crank lever 33 of the push-off unit 18 to push a record R from the shelf 17 so that it slides down the spindle 16 to the rotating turntable. Thereafter the cam 27, operating through the lever 28, detent 29, skirt 31, and tone arm shaft 32, swings the tone arm to a position over the starting groove on the record and lowers the needle gently onto the record. A slight further rotation of the cam 27 will cause the parts to return to their starting position, thus completing the record-changing cycle.

The details of the record-changing mechanism and its operation are set forth in my said preceding application, Ser. No. 595,844.

Switch mechanism

As seen in Figs. 2 to 4, the switch mechanism is mounted on a switch bracket 41 carried by the base 11. A switch lever 42 is pivoted to the bracket 41 and operates a switch 43 carried by the bracket 41 on the far side thereof. The switch lever 42 is provided with an inwardly turned ear 44 which extends through a slot 45 in the bracket 41 and fits between the two bifurcations of a forked switch arm 46 so that pivoting of the lever 42 actuates the switch arm 46 to "on" and "off" positions.

The switch lever 42 is biased to the "off" position by a spring 47 which engages a pin 48 extending through a plunger 49 and through a slot in the switch lever 42. To start the motor 19, the start or "on" button 51 at the top of the plunger 49 is pressed, operating the switch lever 42 to the position shown in Fig. 4. As it reaches this position, a latch lever 52 is pivoted from the position shown in Fig. 2 to the position shown in Fig. 4, its movement being limited by a stop tongue 53 bent out from the bracket 41. As seen in Fig. 4, the latch 52 engages a roller 54 on the lever 42 preventing it from returning to the "off" position of Fig. 2.

When the tone arm 13 is raised, a spring 56 raises a plunger 57 which carries a stop or "off" button 58 at its top. A pawl 59 is pivotally carried by a pin 60 extending through plunger 57. This pawl is so constructed that on the upward movement of the plunger 57 from the Fig. 4 position, it will pivot, as it strikes the latch 52, enough to slip past this latch to the position shown in dotted lines. Thereafter, when the stop button 58 is depressed, either manually or by tone arm 13, the pawl 59 will engage the latch 52 and pivot it so as to release the switch lever 42, the parts then returning to the position shown in Fig. 2. It will be understood that the pawl 59 is biased to the position shown by counterweights 61, the pawl 59 being constituted by the central portion of a U-shaped member which straddles the plunger 57.

Both the pins 48 and 60 ride in slots 63 (dotted lines in Fig. 2) in the bracket 41, thus serving to limit the movement of their respective plungers and to prevent rotation of these plungers.

For ease of operation, the surface of latch 52 engaging roller 54 recedes from the arcuate path about the latch axis with a pitch of about 5°.

Automatic play

In the case of automatic play, the "on" button 51 is pressed down farther than previously described so that the switch lever 42 swings beyond the position shown in Fig. 4 to actuate a trip lever 64. This in turn actuates the trigger 69 which releases the clutch dog C, which is biased to engaging position for causing rotation of the cycling cam 27 to raise the tone arm 13 from the button 58 and for causing a record to drop onto the turntable. After all of the records have been played, the tone arm 13 will, in accordance with this invention, be returned to the stop button 58 where its weight will press the stop button down to trip the latch 52 so as to permit the switch parts to return to the position of Fig. 2 in which position the switch 43 is off, breaking the main circuit.

It may be noted that if at any time during the play of a record, it is desired to reject that record or discontinue the playing thereof, it is merely necessary to press the start or "on" button which will swing the switch lever 42 from the position shown in Fig. 4 to actuate the trip lever 64 and start the record-changing cycle.

Manual operation

There are times when it is desired not to have automatic operation. As seen in Figs. 1 and 2, the "on" or start button 51 is surrounded at its base by a knob 65 which is provided with a pointer 66 which points to the word "automatic" in Fig. 1, but can be turned with the knob 65 to point to the word "manual." A lock arm 67 is carried by the knob 65 and rotates with it. As seen best in Fig. 3, this lock arm swings from the full line position for automatic operation to the dotted line position for manual operation. In the dotted line position, it blocks movement of the trip lever 64 so that this trip lever cannot be actuated by the switch lever 42. Furthermore, rigid finger 68 on the trip lever 64 blocks movement of the trigger plate 69 so that it cannot be actuated automatically by movement of the tone arm.

Automatic shut-off

As previously described, the tone arm will shut off the phonograph when it is lowered onto the stop button 58. Also, as previously described, the tone arm is raised, swung, and lowered during the record-changing cycle by means of the cycling cam 27, lever 28, detent 29, skirt 31, and tone arm shaft 32. When a record is to be played, the tone arm is positioned over the starting groove of the record by virtue of the fact that the detent 29 engages a notch 71 in the skirt 31 and hence swings the skirt to a predetermined position corresponding to the proper tone arm position for setting the needle on the starting groove.

According to the present invention, the automatic shut-off is accomplished by stopping the skirt 31 before the swinging tone arm reaches the position over the starting groove and in a position directly over the stop button 58 so that when the tone arm is lowered, it will actuate the stop button. When the skirt 31 is thus stopped, the detent 29 merely slips out of the notch 71 and proceeds to its usual position.

As seen best in Figs. 7 and 10, the skirt 31 is stopped by a stop finger 73 which is formed integrally on a scale lever 74. This stop finger 73 (see Figs. 9 and 10) is usually positioned above the skirt 31 where it has no effect. At the proper time, it is lowered to the level of the skirt 31, so that as the skirt is rotated to turn the tone arm inwardly, the finger 73 will engage a shoulder 76 on the skirt and stop its rotation. Further movement of the detent 29 under control of the cam 27 results in a sliding of the detent along the skirt, and then lowering the skirt and hence lowering the tone arm shaft 32 and the tone arm, the latter coming to rest on the stop button 58 which it actuates.

The stop finger 73 is normally held in the raised position, as seen in Fig. 5 by the weight of the record or records R resting on the spindle 16. In effect, the scale lever 74 weighs the spindle 16 together with the record load, if any, that is supported thereon, and, of course, other weighing means could be substituted. The finger 73 comprises a part of control means operating in response to the weighing means. When a record is on the shelf 17, the spindle (with the record) weighs enough to rock the scale lever 74 about its pivot 78 to the position shown in Fig. 5 where the stop finger 73 is disposed above the level of the skirt or cup 31. When the last record R is pushed off of the shelf 17, the weight of the spindle 16 is no longer sufficient to hold the scale lever 74 in this position. In other words, the weight of the right-hand portion of the scale lever 74, as seen in Fig. 5 is sufficient to overcome the weight of the empty spindle 16 and cause the spindle to rise to the position shown, for illustration, in Fig. 6. In reality, the spindle would still be resting on a spring member 79 that is carried by the scale lever 74, which is being held in the position shown in full lines, as described below.

Shut-off delay

As seen in Fig. 6, the shelf 17 of spindle 16 is empty, but a record is just dropping, and this record should be played before the shut-off is effective. If the scale lever were permitted at this time to raise the spindle 16, the stop finger 73 would drop into a position to prevent the return of the tone arm to playing position. Then the last record R would not be played.

In order to permit playing of the last record R, the scale lever 74 is held in the position shown in Figs. 5 and 6 with the parts related as shown in Fig. 6. Thus, as the push-off unit 18 is actuated by the cycling cam 27 to push the record R off of the shelf 17, a delay finger 81 carried by the push-off unit 18 swings in over a companion lug 82 formed on the scale lever 74 and holds the scale lever 74 in the position shown with the finger 73 above the level of the skirt or cup 31, as is perhaps most clearly seen in Fig. 10.

After the spring detent 29 swings the skirt 31 so that its shoulder 76 passes under stop finger 73, the cam 27 will release the push-off unit 18 so that the delay finger 81 will release the scale lever 74. The latter will then swing so that the stop finger 73 will ride on the skirt 31 and will fall into blocking position the next time that the detent 29 swings the skirt to the position in which the tone arm is swung away from the turntable. The detent 29 will be ineffective to swing the tone arm back to the playing position since the stop finger 73 will engage the shoulder 76 and thus stop the tone arm so that the detent 29 will lower it onto the stop button 58.

The stop finger 73 should not obstruct the tone arm to prevent its being manually moved operatively with respect to the record for the play of a record, and hence the lowermost position of the stop finger 73 is slightly above the skirt 31 when the latter is at rest, as seen in Figs. 8 and 9. The tone arm should be so mounted that it can be raised manually without raising the spindle.

It is desirable, however, that the tone arm should not swing too easily from its position on the stop button 58, as damage might then result in the event the phonograph be tilted somewhat, as when moving it or cleaning under it. To yieldably retain the tone arm on the stop button, a retaining finger 86 is provided on the skirt 31, as seen in Fig. 8. When the tone arm is dropped onto to the stop button by lowering the tone arm shaft 32, the finger 86 settles into the angular groove on the top of a collar 87 which is adjusted and locked to the proper height for this purpose on a post 88. The post 88 also serves as one of the posts supporting the bottom plate 89 from the base 11.

With this arrangement, the phonograph can be tilted quite a few degrees before the tone arm will swing by gravity from its position on the stop button. However, the resistance to manual moving of the tone arm need not be noticeable, and there is no resistance to the swing of the tone arm in the record-playing range. It may be noted that the tone arm swings extremely freely due to the fact that its shaft 32 rests on a point-like support, and also because the tone arm may be mounted in such a manner that, during play, its weight does not produce any torsion or side thrust on the shaft 32. In addition, the trigger plate 69 is operated by a very light touch of an automatic trip lever 91 which is carried by tone arm shaft 32, so that very little frictional torque need be applied to this trip lever 91 through the friction device of which a spring 92 may be a part.

All of the foregoing considerations regarding ease of movement of the tone arm permit the use of a very light tone arm. This in turn requires that the stop button 58 and its plunger 57, together with the latch 52 operated thereby, must operate very easily in order that the weight of the light tone arm will be sufficient to actuate them reliably.

As illustrated in Figs. 5 and 6, the spindle 16 rests on a spring 79 carried by the scale lever 74. This spring has been found to be very advantageous in prolonging the life of records. When a stack of records rests on the spindle shelf 17 and the lowest record of this stack is pushed off of the shelf, there is a successive dropping of the others upon the same shelf. Although the distance of the drop is not far, the conventional rigid spindle, nevertheless, delivers a severe blow to each record when it strikes the shelf 17. The spring 79, although stiff enough to support with very little flexing all of the records for which the phonograph is designed, permits the spindle 16 to yield under the impact resulting when the records drop on the shelf 17. A very slight yield will increase the stopping time several fold and hence correspondingly decrease the force of the impact of the records on shelf 17. It has been found that this reduces the impact below a critical value which the records can withstand without injury. This permits the records to be kept in good condition at the center hole even though played automatically on the illustrated phonograph for the life of the record groove.

Although the use of the stiff leaf spring 79 lends itself admirably to the present invention in which the leaf spring 79 is carried by a scale lever 74, it is apparent that the leaf spring, or some other type of spring, could also be used for resiliently mounting the spindle from the scale lever 74, or even if the automatic shut-off features including the lever 74 were omitted. For example, a coil spring could be used as disclosed in my previous application, Ser. No. 595,844.

From the foregoing, it is seen that an automatic record-changing phonograph is provided in which a single but highly effective shut-off mechanism is used in conjunction with the switch mechanism of an electrically operated phonograph having an automatic record changer, particularly one of the type herein indicated.

I claim:

1. A record changing phonograph including a start button, a switch lever biased to an off position and operated by the start button to an on position, a latch biased to a latching position in which it locks the switch lever in the on position, an off button, a vertically movable plunger carrying the off button and biased to an off position, and a pawl carried by said plunger and actuated by the off button and the downward movement of said plunger to release the latch and pivotally mounted to ride freely past the latch on the return stroke of the off button and the plunger.

2. Switch mechanism for phonographs including a start button, a switch lever biased to an off position, operated by the start button to an on position, a latch biased to a switch lever engaging position in which it locks the switch lever in the on position, an off button, a vertically movable plunger carrying the off button, and a pawl pivotally mounted on the plunger and arranged to release the latch on the downward movement of the off button and plunger and pivotally mounted to swing freely past the latch on the upward movement of the plunger and the off button to cause the latch to engage the switch lever upon subsequent actuation of the same.

COLIN B. DALE.

REFERENCES CITED

The following references are of record in the file of this patent:

UNITED STATES PATENTS

| Number | Name | Date |
|---|---|---|
| 425,205 | Bush | Apr. 8, 1890 |
| 501,707 | Dingle | July 18, 1893 |
| 949,799 | Lee | Feb. 22, 1910 |
| 1,234,922 | Mattison | July 31, 1917 |
| 1,876,498 | Hawkins | Sept. 6, 1932 |
| 2,284,813 | Gary | June 2, 1942 |
| 2,333,414 | De Tar | Nov. 2, 1943 |
| 2,348,924 | Roe | May 16, 1944 |
| 2,457,106 | Pressley | Dec. 21, 1948 |
| 2,496,658 | Dale | Feb. 7, 1950 |

FOREIGN PATENTS

| Number | Country | Date |
|---|---|---|
| 419,299 | Great Britain | Nov. 5, 1934 |
| 429,635 | Great Britain | June 4, 1935 |
| 459,208 | Great Britain | Jan. 4, 1937 |
| 545,956 | Great Britain | June 19, 1942 |